US010922223B2

United States Patent
Kim et al.

(10) Patent No.: US 10,922,223 B2
(45) Date of Patent: Feb. 16, 2021

(54) STORAGE DEVICE, COMPUTING SYSTEM INCLUDING STORAGE DEVICE, AND METHOD OF OPERATING THE SAME

(71) Applicant: SK hynix Inc., Gyeonggi-do (KR)

(72) Inventors: Byung Jun Kim, Seoul (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/598,724

(22) Filed: Oct. 10, 2019

(65) Prior Publication Data

US 2020/0233796 A1 Jul. 23, 2020

(30) Foreign Application Priority Data

Jan. 22, 2019 (KR) .................. 10-2019-0008172

(51) Int. Cl.
*G06F 12/02* (2006.01)
*G06F 12/123* (2016.01)
*G06F 12/0868* (2016.01)
*G06F 13/16* (2006.01)
*G06F 12/0873* (2016.01)

(52) U.S. Cl.
CPC ...... *G06F 12/0246* (2013.01); *G06F 12/0868* (2013.01); *G06F 12/0873* (2013.01); *G06F 12/123* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| 9,104,327 B2 * | 8/2015 | Gorobets | ................ G06F 12/10 |
| 10,178,147 B1 * | 1/2019 | Kolam | ................ H04L 67/2814 |
| 2017/0228322 A1 * | 8/2017 | Chang | ................ G06F 12/0868 |

FOREIGN PATENT DOCUMENTS

| KR | 10-2014-0057454 | 5/2014 |
| KR | 10-2016-0148952 | 12/2016 |

* cited by examiner

*Primary Examiner* — Michael Alsip
(74) *Attorney, Agent, or Firm* — IP & T Group LLP

(57) ABSTRACT

A memory controller may control a memory device for storing logical to physical (L2P) mapping information, the memory controller comprising: a map data storage configured to store a plurality of L2P address segments included in the L2P mapping information; and a map data manager configured to: provide at least one L2P address segment of the plurality of L2P address segments to the host in response to a map data request of the host; and remove a L2P address segment from the map data storage, wherein the L2P address segment is selected, among the plurality of L2P address segments, based on a least recently used (LRU) frequency and whether the L2P address segment is provided to the host.

20 Claims, 14 Drawing Sheets

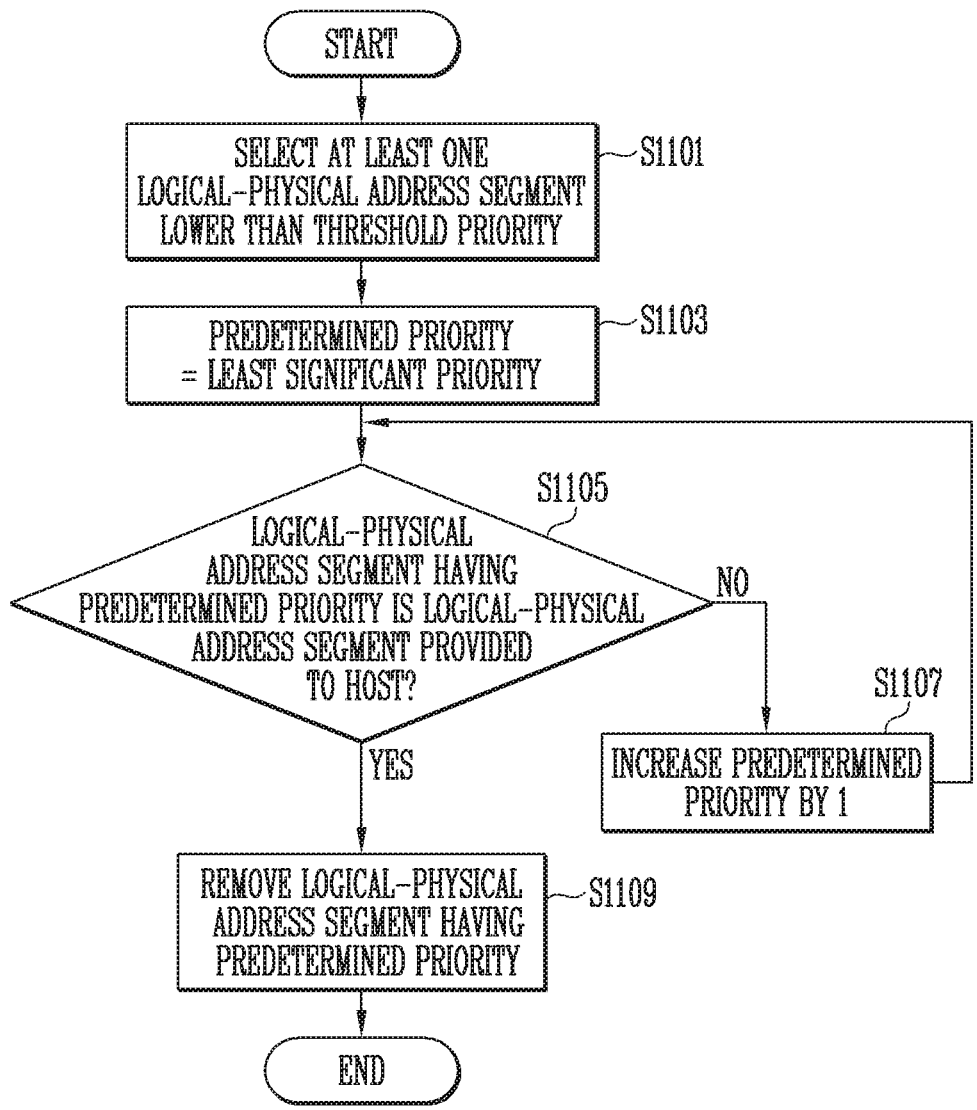

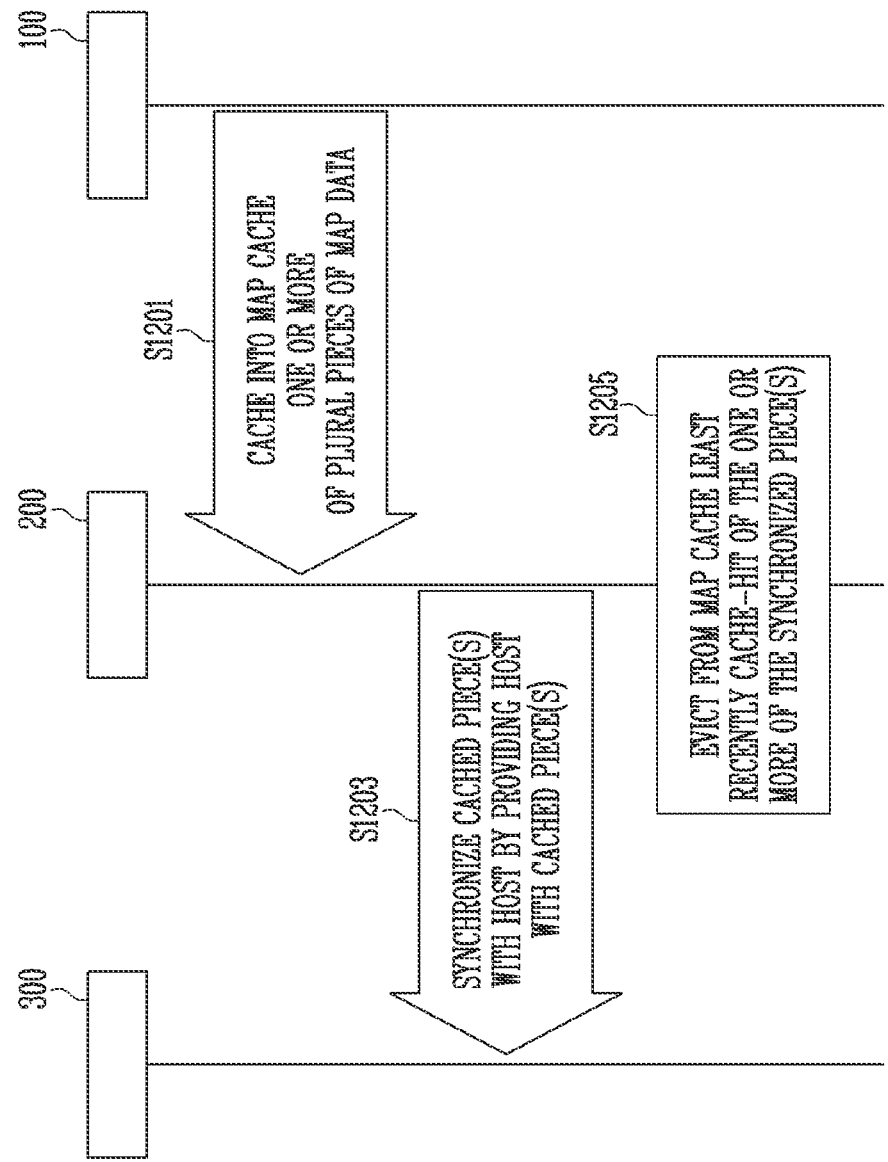

STORAGE DEVICE, COMPUTING SYSTEM INCLUDING STORAGE DEVICE, AND METHOD OF OPERATING THE SAME

CROSS-REFERENCE TO RELATED APPLICATION

The present application claims priority under 35 U.S.C. § 119(a) to Korean patent application number 10-2019-0008172, filed on Jan. 22, 2019, the entire disclosure of which is incorporated herein by reference in its entirety.

BACKGROUND

Field of Invention

Various embodiments of the present disclosure generally relate to an electronic device, and more particularly, to a storage device, a computing system including the storage device, and a method of operating the computing system.

Description of Related Art

Generally, a storage device stores data under control of a host device such as a computer or a smartphone. The storage device may include a memory device configured to store data, and a memory controller configured to control the memory device. Memory devices are chiefly classified into volatile memory devices and nonvolatile memory devices.

A volatile memory device stores data only when power is supplied thereto; data stored therein is lost when power is turned off. Examples of a volatile memory device include a static random access memory (SRAM), and a dynamic random access memory (DRAM).

In a nonvolatile memory device, data stored therein is maintained even when power is turned off. Examples of a nonvolatile memory device include a read-only memory (ROM), a programmable ROM (PROM), an electrically programmable ROM (EPROM), an electrically erasable programmable ROM (EEPROM), and a flash memory.

SUMMARY

Various embodiments of the present disclosure are directed to a storage device having an enhanced map data access performance, a computing system including the storage device, and a method of operating the computing system.

An embodiment of the present disclosure may provide for a memory controller configured to control a memory device for storing logical to physical (L2P) mapping information, the memory controller comprising: a map data storage configured to store a plurality of L2P address segments included in the L2P mapping information; and a map data manager configured to: provide at least one L2P address segment of the plurality of L2P address segments to the host in response to a map data request of the host; and remove a L2P address segment from the map data storage. wherein the L2P address segment is selected, among the plurality of L2P address segments, based on a least recently used (LRU) frequency and whether the L2P address segment is provided to the host.

An embodiment of the present disclosure may provide for a method of operating a memory controller including a map cache configured to store map data, the method including: storing a plurality of logical to physical (L2P) address segments received from the memory device in the map cache; providing at least one L2P address segment among the plurality of L2P address segments to a host in response to a map data request of the host; selecting a L2P address segment from among the plurality of L2P address segments, based on a least recently used (LRU) frequency and whether the L2P address segment is provided to the host; and removing the selected L2P address segment from the map cache.

An embodiment of the present disclosure may provide for a computing system including: a storage device; and a host configured to access the storage device, wherein the storage device comprises: a memory device configured to store logical to physical (L2P) mapping information including a plurality of L2P address segments; and a memory controller including a map cache for storing map data, and configured to: store the plurality of L2P address segments received from the memory device; provide at least one L2P address segment of the plurality of L2P address segments to the host in response to a map data request of the host; and remove, a L2P address segment from the map cache. wherein the L2P address segment is selected, among the plurality of L2P address segments, based on a least recently used (LRU) frequency and whether the L2P address segment is provided to the host.

An embodiment of the present disclosure may provide for a computing system, the computing system comprising: a host configured to provide an access request together with map data stored therein; a memory device configured to store plural pieces of map data; a map cache configured to cache one or more pieces of map data from the memory device; and a controller configured to: control the memory device to perform an operation in response to the access request and according to the provided map data or the cached pieces; synchronize one or more of the cached pieces with the host by providing the host with the one or more of the cached pieces; and evict from the map cache least recently cache-hit piece(s) of the one or more of the synchronized pieces.

An embodiment of the present disclosure may provide for a controller, the controller comprising: a map cache configured to cache one or more pieces of map data from a memory device; and a processor configured to: control the memory device to perform an operation in response to an access request provided together with map data from a host and according to the provided map data or the cached pieces; synchronize one or more among the cached pieces with the host by providing the host with the one or more among the cached pieces; and evict from the map cache least recently cache-hit piece(s) of the one or more of the synchronized pieces.

An embodiment of the present disclosure may provide for a method of operating a controller, the operating method comprising: caching one or more pieces of map data from a memory device; controlling the memory device to perform an operation in response to an access request provided together with map data from a host and according to the provided map data or the cached pieces; synchronizing one or more of the cached pieces with the host by providing the host with the one or more of the cached pieces; and evicting from the cached pieces least recently cache-hit piece(s) of the one or more of the synchronized pieces.

BRIEF DESCRIPTION OF THE DRAWINGS

FIG. 11 is a flowchart illustrating in detail an operation of the memory controller of FIG. 9.

FIG. 11A is a flowchart illustrating an operation of the memory controller 200 in accordance with an embodiment of the present invention.

DETAILED DESCRIPTION

Embodiments of the present disclosure are explained in detail below with reference to the accompanying drawings.

Figure 1:
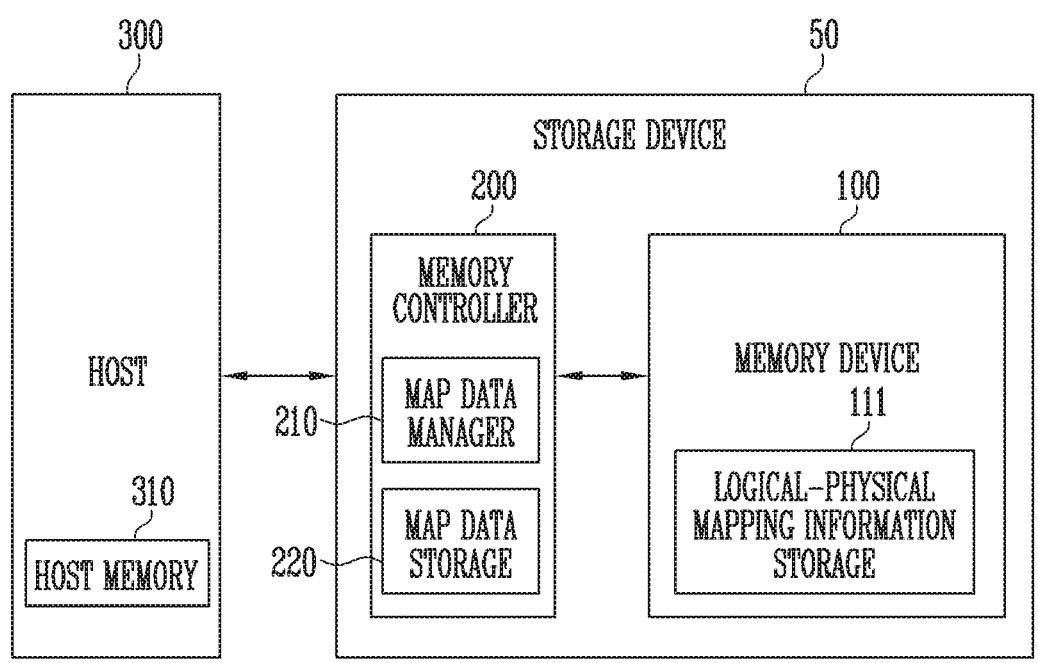
FIG. 1 is a diagram illustrating a storage device in accordance with an embodiment of the present disclosure.

FIG. 1 is a diagram illustrating a storage device 50 in accordance with an embodiment of the present disclosure.

Referring to FIG. 1, a computing system may include a storage device 50 and a host 300. The host 300 may access the storage device 50 under control of a user. The computing system may correspond to a user system of FIG. 15 which is described below.

The storage device 50 may include a memory device 100, and a memory controller 200 configured to control the operation of the memory device 100. The storage device 50 may be configured to store data under control of a host 300, such as a cellular phone, a smartphone, an MP3 player, a laptop computer, a desktop computer, a game machine, a TV, a tablet PC, or an in-vehicle infotainment system.

The storage device 50 may be configured as any of various kinds of storage devices depending on a host interface, which is a communication system with the host 300. For example, the data storage device 50 may be configured as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and/or a memory stick.

The storage device 50 may be manufactured in the form of any of various package types. For instance, the storage device 50 may be manufactured as a package on package (POP) type, a system in package (SIP) type, a system on chip (SOC) type, a multi-chip package (MCP) type, a chip on board (COB) type, a wafer-level fabricated package (WFP) type, and/or a wafer-level stack package (WSP) type.

The memory device 100 may store data therein. The memory device 100 may operate under control of the memory controller 200. The memory device 100 may include a memory cell array including a plurality of memory cells configured to store data therein.

The memory cells may include a single level cell (SLC) capable of storing a single data bit, a multi-level cell (MLC) capable of storing two data bits, a triple-level cell (TLC) capable of storing three data bits, or a quad-level cell (DLC) capable of storing four data bits.

The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100. Each memory block may be the unit of erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), or a spin transfer torque random access memory (STT-RAM). In context of the description below, the memory device 100 is a NAND flash memory.

The memory device 100 may receive a command and an address from the memory controller 200 and access an area of the memory cell array that is selected by the address. In other words, the memory device 100 may perform an operation corresponding to the command on the area selected by the address. For example, the memory device 100 may perform a write (program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

In an embodiment, the memory device 100 may include a logical to physical mapping information storage 111.

The logical to physical mapping information storage 111 may store logical to physical mapping information. The logical to physical mapping information may be information indicating a mapping relationship between a logical address of data provided from the host 300 and a physical address of the memory device 100 in which the data is stored.

In an embodiment, the logical to physical mapping information may include a plurality of logical to physical address segments. Each logical to physical address segment may include a plurality of logical addresses, and a plurality of physical addresses which are respectively mapped to the plurality of logical addresses. The plurality of logical addresses may be logical addresses of data provided from the host 300 to store the data in the memory device 100. The plurality of physical addresses may be physical addresses of the memory device 100 in which the data provided from the host 300 are stored.

In an embodiment, the logical to physical mapping information storage 111 may be formed of respective spare areas of the plurality of memory blocks included in the memory cell array. In an embodiment, the logical to physical mapping information storage 111 may be formed of at least one system block, which stores system information, among the plurality of memory blocks included in the memory cell array. In an embodiment, the logical to physical mapping information storage 111 may be formed of word lines disposed at specific positions among word lines included in the plurality of respective memory blocks included in the memory cell array.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which data is to be stored, the memory cells being included in the memory device 100.

The memory controller 200 may control the memory device 100 to perform a program operation, a read operation, or an erase operation in response to a request from the host 300. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a program command, an address and data regardless of a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 in an interleaving manner so as to enhance the operating performance. The interleaving scheme may be an operating scheme of overlapping operating periods of at least two or more memory devices 100.

In an embodiment, the memory controller 200 may include a map data manager 210 and a map data storage 220.

The memory controller 200 may receive, from the memory device 100, some of the logical to physical mapping information stored in the memory device 100, and store the received logical to physical mapping information. The memory controller 200 may enhance performance of accessing data stored in the memory device 100 using the stored some logical to physical mapping information.

In an embodiment, the map data manager 210 may request a plurality of logical to physical address segments from the memory device 100. The plurality of logical to physical address segments may be logical to physical address segments included in the logical to physical mapping information stored in the logical to physical mapping information storage 111. The map data manager 210 may store, in the map data storage 220, a plurality of logical to physical address segments obtained from the memory device 100.

The map data manager 210 may provide at least one of the plurality of logical to physical address segments stored in the map data storage 220 to the host 300, in response to a map data request provided from the host 300.

The map data manager 210 may select at least one logical to physical address segment to be provided to the host 300. In an embodiment, the map data manager 210 may select at least one logical to physical address segment to be provided to the host 300, based on a number of times to each of the plurality of logical to physical address segments is accessed (count of access) in response to a read request provided from the host 300. In an embodiment, the map data manager 210 may select at least one logical to physical address segment to be provided to the host 300, based on the size of data to be accessed using each of the plurality of logical to physical address segments in response to a read request provided from the host 300.

The map data manager 210 may determine priorities between the plurality of logical to physical addresses segments, based on frequency or recency of access to each of the plurality of logical to physical address segments in response to a request provided from the host 300.

In detail, the map data manager 210 may set priorities between the plurality of logical to physical addresses segments, based on a least recently used (LRU) frequency of each of the plurality of logical to physical address segments to be accessed in response to a request provided from the host 300. The LRU frequency may be a relative index indicating a frequency of access to each logical to physical address segment in response to a request provided from the host 300. For example, of two logical to physical address segments, a logical to physical address segment having a high LRU frequency value may be less in a frequency of access thereto in response to a request provided from the host 300 than that of a logical to physical address segment having a low LRU frequency value.

In an embodiment, the map data manager 210 may set the priority of a logical to physical address segment such that the lower the LRU frequency value of the logical to physical address segment, the higher the priority of the logical to physical address segment. The map data manager 210 may set the priority of a logical to physical address segment such that the higher the LRU frequency value of the logical to physical address segment, the lower the priority of the logical to physical address segment.

The map data manager 210 may set the priority of at least one logical to physical address segment stored in the map data storage 220 to a specific priority, which may be predetermined. The at least one logical to physical address segment may be a logical to physical address segment provided from the map data manager 210 to the host 300. The specific priority may be determined, taking into account the time it takes for the at least one logical to physical address segment to be removed from the map data storage 220. In other words, the specific priority is determined based on a time estimated the at least one L2P address segment is evicted from the map data storage. The specific priority is determined to prevent the at least one logical to physical address segment from being evicted from the map data storage 220 immediately right after the at least one logical to physical address segment is provided to the host 300.

If a logical address of data to be read in response a read request received from the host 300 is not included in the plurality of logical to physical address segments, the map data manager 210 may receive and store a new logical to physical address segment from the memory device 100. The new logical to physical address segment may be a logical to physical address segment including the logical address of the data to be read. The map data manager 210 may set the priority of the new logical to physical address segment to a specific priority, which may be predetermined and/or may be the most significant priority. In other words, the specific priority may be set as the highest value.

When a read request is received from the host 300, the map data manager 210 may update the priorities of the plurality of logical to physical address segments.

In an embodiment, in response to the read request received from the host 300, any one of the plurality of logical to physical address segments may be accessed. If a logical to physical address segment is accessed, the respective LRU frequencies of the plurality of logical to physical address segments may be changed. The LRU frequency of each logical to physical address segment may be determined depending on a frequency of access to each logical to physical address segment. Therefore, the map data manager 210 may update the priorities of the plurality of logical to physical address segments, based on the respective changed LRU frequencies of the plurality of logical to physical address segments.

In an embodiment, if a logical address of data to be read in response a read request received from the host 300 is not included in the plurality of logical to physical address segments, the map data manager 210 may receive and store a new logical to physical address segment from the memory device 100. The map data manager 210 may set the priority of the new logical to physical address segment. The map data manager 210 may update the priorities of the plurality of logical to physical address segments including the new logical to physical address segment.

The map data manager 210 may select at least one logical to physical address segment to be removed among the plurality of logical to physical address segments stored in the map data storage 220, based on the priorities of the plurality of logical to physical address segments.

In an embodiment, the map data manager 210 may select at least one logical to physical address segment in an order from the lowest priority among the plurality of logical to physical address segments as a logical to physical address segment to be removed.

In an embodiment, the map data manager 210 may select at least one logical to physical address segment having a priority lower than a threshold priority among the plurality of logical to physical address segments as a logical to physical address segment to be removed.

In an embodiment, the map data manager 210 may select a logical to physical address segment to be removed among the plurality of logical to physical address segments, based on whether the logical to physical address segment is a logical to physical address segment provided in the host 300.

The map data storage 220 may store a plurality of logical to physical address segments received from the memory device 100, under control of the map data manager 210. The plurality of logical to physical address segments may be included in a part of the logical to physical mapping information stored in the memory device 100.

In an embodiment, at least one logical to physical address segment stored in the map data storage 220 may be provided to the host 300 under control of the map data manager 210. In an embodiment, at least one logical to physical address segment stored in the map data storage 220 may be removed from the map data storage 220 under control of the map data manager 210.

The host 300 may communicate with the storage device 50 using at least one of various communication methods, such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

In an embodiment, the host 300 may include a host memory 310.

The host 300 may provide a map data request to the memory controller 200 to request some of map data stored in the memory controller 200. The host 300 may store, in the host memory 310, at least one logical to physical address segment obtained from the memory controller 200 in response to the map data request.

The host 300 may provide, to the memory controller 200, a request for reading data stored in the memory device 100, based on the at least one logical to physical address segment stored in the host memory 310. In detail, the host 300 may provide, to the memory controller 200, a physical address that is mapped with a logical address of the data to be read along with the request for reading. The physical address mapped with the logical address of the data to be read may be a physical address included in at least one logical to physical address segment stored in the host memory 310.

The physical address provided by the host 300 to the memory controller 200 may have been previously provided by the memory controller 200 to the host 300 through a sync-up operation, which is described below with reference to steps S903 and S905 of FIG. 9. That physical address may also be cached in the map data storage 220, as also described below with reference to step S901 of FIG. 9. For example, when the read operation is successfully performed according to the physical address provided by the host 300, the logical to physical mapping segment corresponding to that physical address and cached in the map data storage 220 may be regarded as having been accessed (i.e., regarded as cache-hit) at step S907 of setting priorities of the plurality of logical to physical address segments cached in the map data storage 220, based on the respective LRU frequencies of the plurality of logical to physical address segments accessed in response to a request of the host.

Figure 2:
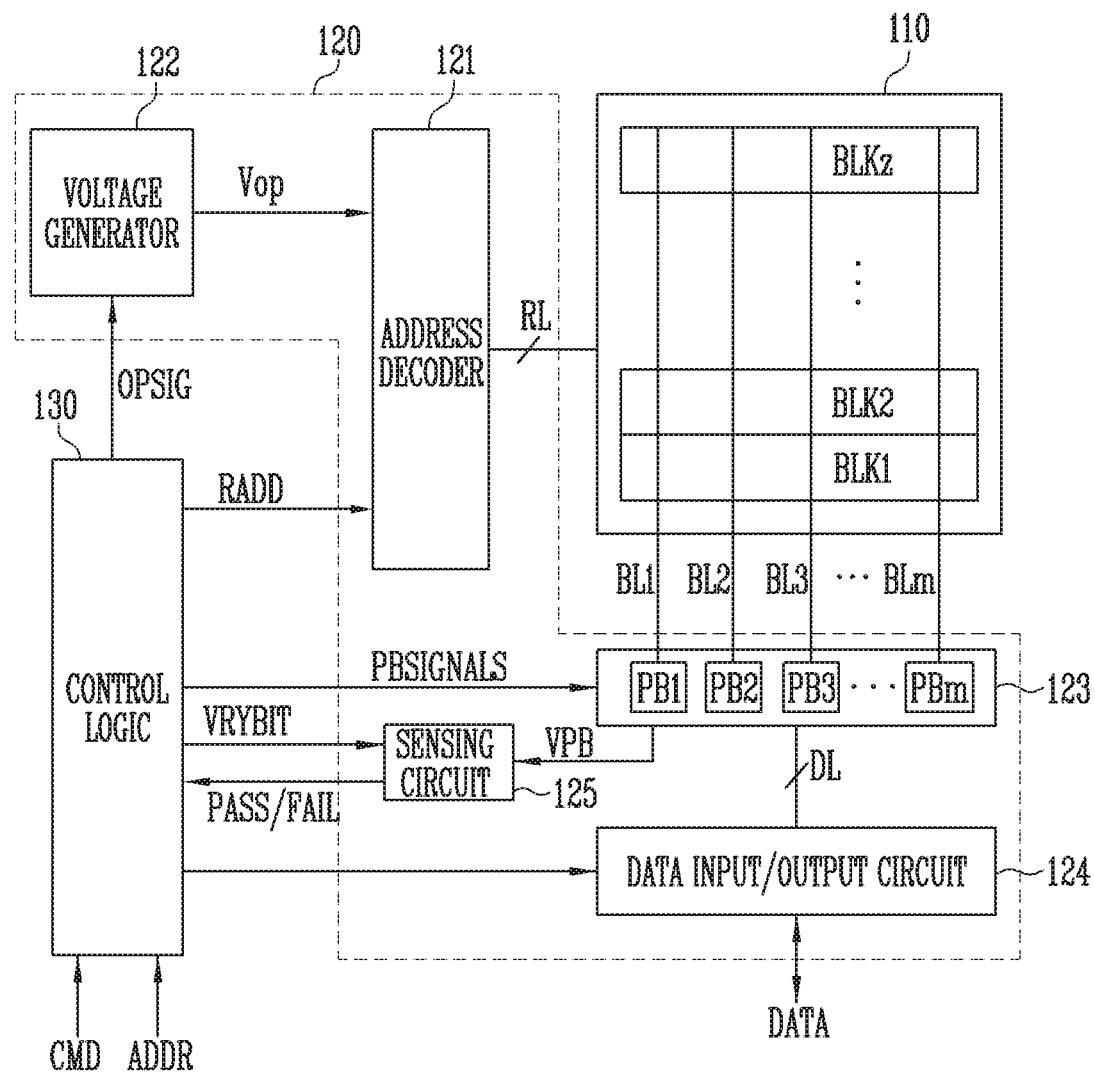
FIG. 2 is a diagram illustrating a configuration of a memory device, such as that of FIG. 1.

FIG. 2 is a diagram illustrating the configuration of the memory device 100 of FIG. 1.

Referring to FIG. 2, the memory device 100 may include a memory cell array 110, a peripheral circuit 120, and control logic 130.

The memory cell array 110 may include a plurality of memory blocks BLK1 to BLKz. The plurality of memory blocks BLK1 to BLKz are coupled to an address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 may be formed of a plurality of physical pages. In an embodiment, each of the memory blocks BLK1 to BLKz included in the memory cell array 110 may include a plurality of dummy cells. One or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

In an embodiment, the memory cell array 110 may include a logical to physical mapping information storage (not shown).

The logical to physical mapping information storage may store logical to physical mapping information. The logical to physical mapping information may indicate a mapping relationship between a logical address of data provided from the host described with reference to FIG. 1 and a physical address of the memory cell array 110 in which the data is stored.

In an embodiment, the logical to physical mapping information may include a plurality of logical to physical address segments. Each logical to physical address segment may include a plurality of logical addresses, and a plurality of physical addresses which are respectively mapped to the plurality of logical addresses. The plurality of logical addresses may be provided from the host. The plurality of physical addresses may be physical addresses of the memory blocks, in which data provided from the host are stored, the physical addresses being included in the memory cell array 110.

In an embodiment, the logical to physical mapping information storage may be formed of respective spare areas of the plurality of memory blocks included in the memory cell array 110. In an embodiment, the logical to physical mapping information storage may be formed of at least one system block, which stores system information, among the plurality of memory blocks included in the memory cell array 110. In an embodiment, the logical to physical mapping information storage may be formed of word lines disposed at specific positions among word lines included in the plurality of memory blocks included in the memory cell array 110.

The peripheral circuit 120 may include an address decoder 121, a voltage generator 122, a read/write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 may select at least one of the memory blocks BLK1 to BLKz according to the decoded block address. The address decoder 121 may decode a row address RADD among the received addresses ADDR. The address decoder 121 may select at least one word line WL of the selected memory block by applying voltages supplied from the voltage generator 122 to at least one word line WL according to the decoded row address RADD.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In an embodiment, an erase operation of the memory device 100 may be performed on a memory block basis. During the erase operation, an address ADDR to be input to the memory device 100 includes a block address. The address decoder 121 may decode the block address and select a corresponding memory block according to the decoded block address. During the erase operation, the address decoder 121 may apply a ground voltage to word lines coupled to the selected memory block.

In an embodiment of the present disclosure, the address decoder 121 may decode a column address among the transmitted addresses ADDR. The decoded column address may be transr pitted to the read/write circuit 123. For example, the address decoder 121 may include components such as a row decoder, a column decoder, and an address buffer.

The voltage generator 122 may generate a plurality of operating voltages Vop using an external supply voltage supplied to the memory device 100. The voltage generator 122 may operate under control of the control logic 130.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of operating voltages Vop using an external supply voltage or an internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include, so as to generate a plurality of operating voltages Vop having various voltage levels, a plurality of pumping capacitors configured to receive an internal supply voltage, and may generate a plurality of operating voltages Vop by selectively enabling the plurality of pumping capacitors under control of the control logic 130.

The generated operating voltages Vop may be supplied to the memory cell array 110 by the address decoder 121.

The read/write circuit 123 may include first to m-th page buffers PB1 to PBm, which may be coupled to the memory cell array 110 through the first to m-th bit lines BL1 to BLm, respectively. The first to m-th page buffers PB1 to PBm may operate under control of the control logic 130.

The first to m-th page buffers PB1 to PBm may communicate data DATA with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program enable voltage (e.g., a ground voltage) is applied may have increased threshold voltages. Threshold voltages of memory cells coupled to a bit line to which a program inhibit voltage (for example, a supply voltage) is applied may be retained. During a program verify operation, the first to math page buffers PB1 to PBm may read data DATA from selected memory cells through the bit lines BL1 to BLm.

During a read operation, the read/write circuit 123 may read data DATA from the memory cells of the selected page through the bit lines BL, and store the read data DATA to the first to m-th page buffers PB1 to PBm.

During an erase operation, the read/write circuit 123 may float the bit lines BL. In an embodiment, the read/write circuit 123 may include a column select circuit.

In an embodiment, while data stored in some page buffers of the plurality of page buffers included in the read/write circuit 123 is programmed to the memory cell array 110, the other page buffers may receive new data from the memory controller 200 and store the new data.

The data input/output circuit 124 is coupled to the first to math page buffers PB1 to PBm through the data lines DL. The data input/output circuit 124 may operate under control of the control logic 130.

The data input/output circuit 124 may include a plurality of input/output buffers (not shown) for receiving inputted data DATA. During a program operation, the data input/output circuit 124 may receive data DATA to be stored from an external controller (not shown). During a read operation, the data input/output circuit 124 may output, to the external controller, the data DATA received from the first to m-th page buffers PB1 to PBm included in the read/write circuit 123.

During a read operation or a verify operation, the sensing circuit 125 may generate reference current in response to an enable bit signal VRYBIT generated by the control logic 130, compare a sensing voltage VPB received from the read/write circuit 123 with a reference voltage generated by the reference current, and output a pass signal or a fail signal to the control logic 130.

The control logic 130 may be coupled to the address decoder 121, the voltage generator 122, the read/write circuit 123, the data input/output circuit 124, and the sensing circuit 125. The control logic 130 may control the overall operation of the memory device 100. The control logic 130 may operate in response to a command CMD transmitted from an external device.

The control circuit 130 may generate various signals in response to the command CMD and the address ADD and control the peripheral circuit 120. For example, the control logic 130 may generate an operating signal OPSIG, a row address RADD, a read/write circuit control signal PBSIGNALS, and an enable bit VRYBIT in response to the command CMD and the address ADD. The control logic 130 may output the operating signal OPSIG to the voltage generator 122, output the row address RADD to the address decoder 121, output the read/write control signal to the read/write circuit 123, and output the enable bit VRYBIT to the sensing circuit 125. Furthermore, the control logic 130 may determine whether target memory cells have passed or failed a verification during the verify operation in response to a pass signal PASS or a fail signal FAIL that is output from the sensing circuit 125.

Figure 3:
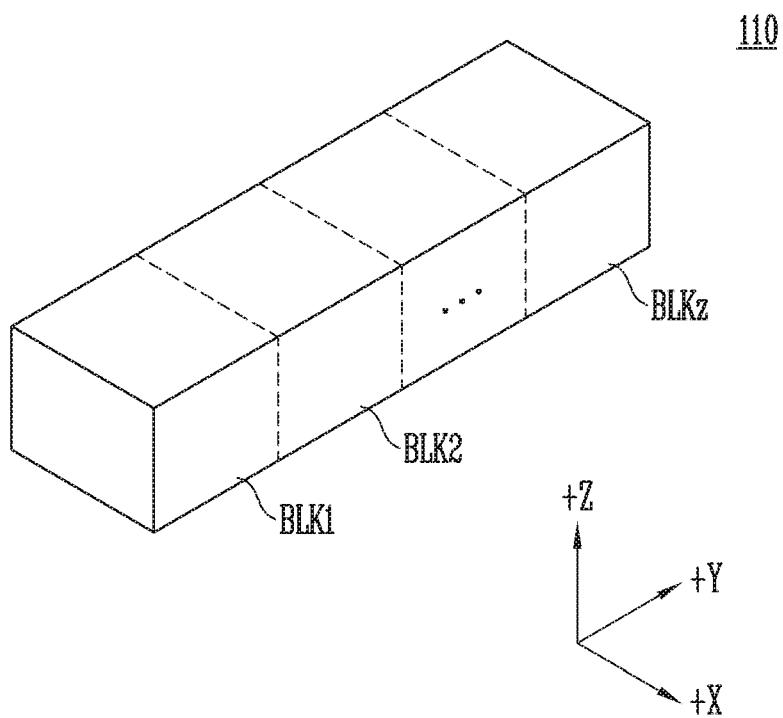
FIG. 3 is a diagram illustrating an embodiment of a memory cell array of FIG. 2.

FIG. 3 is a diagram illustrating an embodiment of a memory cell array 110 of FIG. 2.

Referring to FIG. 3, the memory cell array 110 may include a plurality of memory blocks BLK1 to BLKz. Each memory block has a three-dimensional structure. Each memory block may include a plurality of memory cells stacked on a substrate. The memory cells are arranged in a +X direction, a +Y direction, and a +Z direction. The structure of each memory block is described below in more detail with reference to FIGS. 4 and 5.

Figure 4:
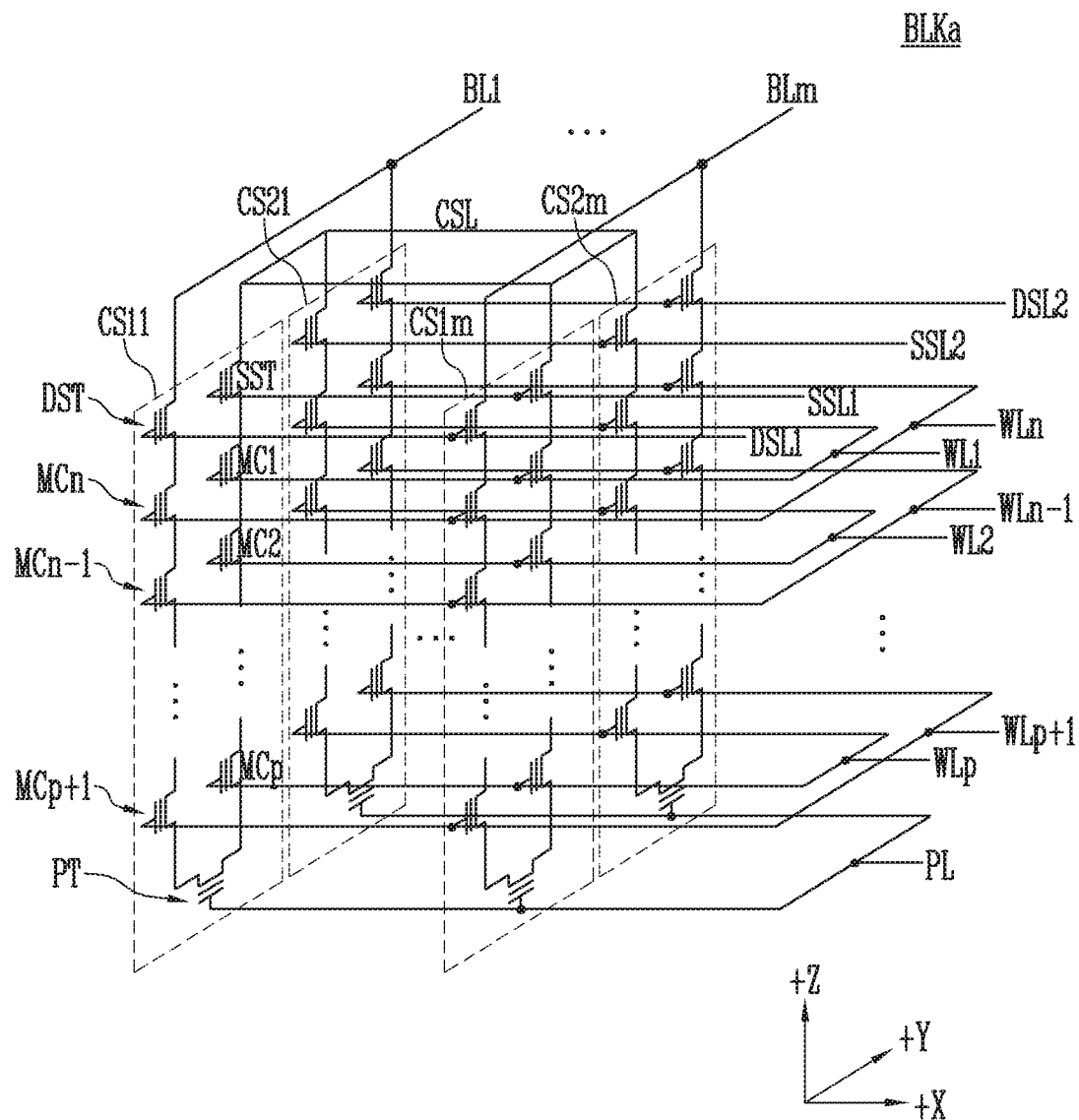
FIG. 4 is a circuit diagram illustrating any one memory block BLKa of memory blocks BLK1 to BLKz of FIG. 3, in accordance with an embodiment of the present disclosure.

FIG. 4 is a circuit diagram illustrating any one memory block BLKa of memory blocks BLK1 to BLKz of FIG. 3, in accordance with an embodiment of the present disclosure.

Figure 5:
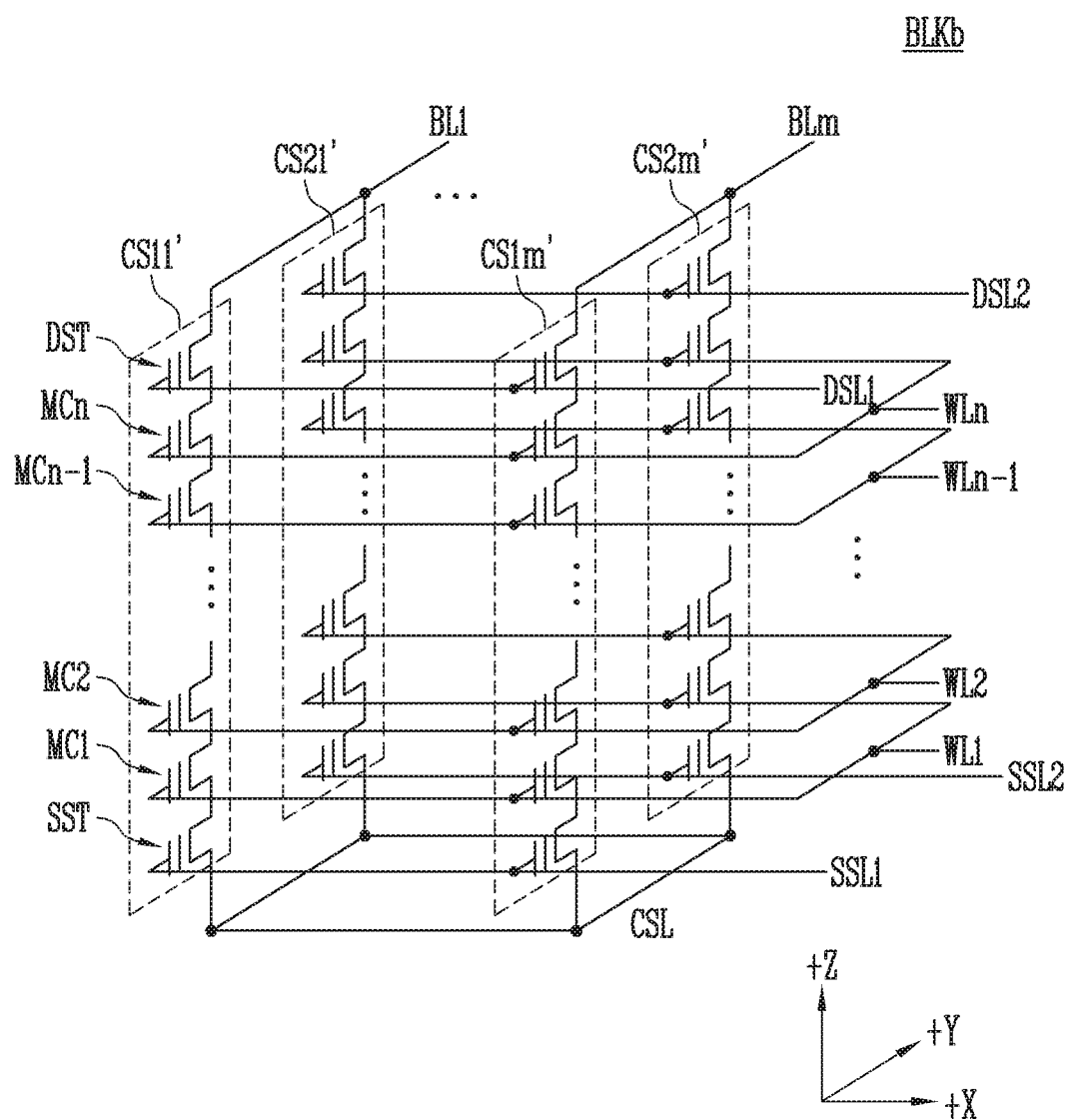
FIG. 5 is a circuit diagram illustrating any one memory block BLKb of the memory blocks BLK1 to BLKz of FIG. 3, in accordance with an embodiment of the present disclosure.

Referring to FIG. 4, the memory block BLKa may include a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings may be arranged in a row direction (i.e., the +X direction). In FIG. 5, two cell strings are illustrated as being arranged in a column direction (i.e., the +Y direction). However, this illustration is for clarity; it will be understood that three or more cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1$m$ in a first row are coupled to a first source select line SSL1. Source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a −Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-number-th cell strings of the cell strings CS11 to CS1m or CS21 to CS2m arranged in the row direction may be coupled to the respective even bit lines. Odd-number-th cell strings of the cell strings CS11 to CS1m or CS21 to CS2m arranged in the row direction may be coupled to the respective odd bit lines.

In an embodiment, at least one of the first to n-th memory cells MC1 to MCn may be used as a dummy memory cell. For example, one or more dummy memory cells may be provided to reduce an electric field between the source select transistor SST and the memory cells MC1 to MCp. Alternatively, one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the dummy memory cell(s), each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

FIG. 5 is a circuit diagram illustrating any one memory block BLKb of the memory blocks BLK1 to BLKz of FIG. 3, in accordance with an embodiment of the present disclosure.

Referring to FIG. 5, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to nth memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 5 may have a circuit similar or equivalent to that of the memory block BLKa of FIG. 4 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, one or more dummy memory cells may be provided to reduce an electric field between the source select transistor SST and the memory cells MC1 to MCn. Alternatively, one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the dummy memory cell(s), each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 6:
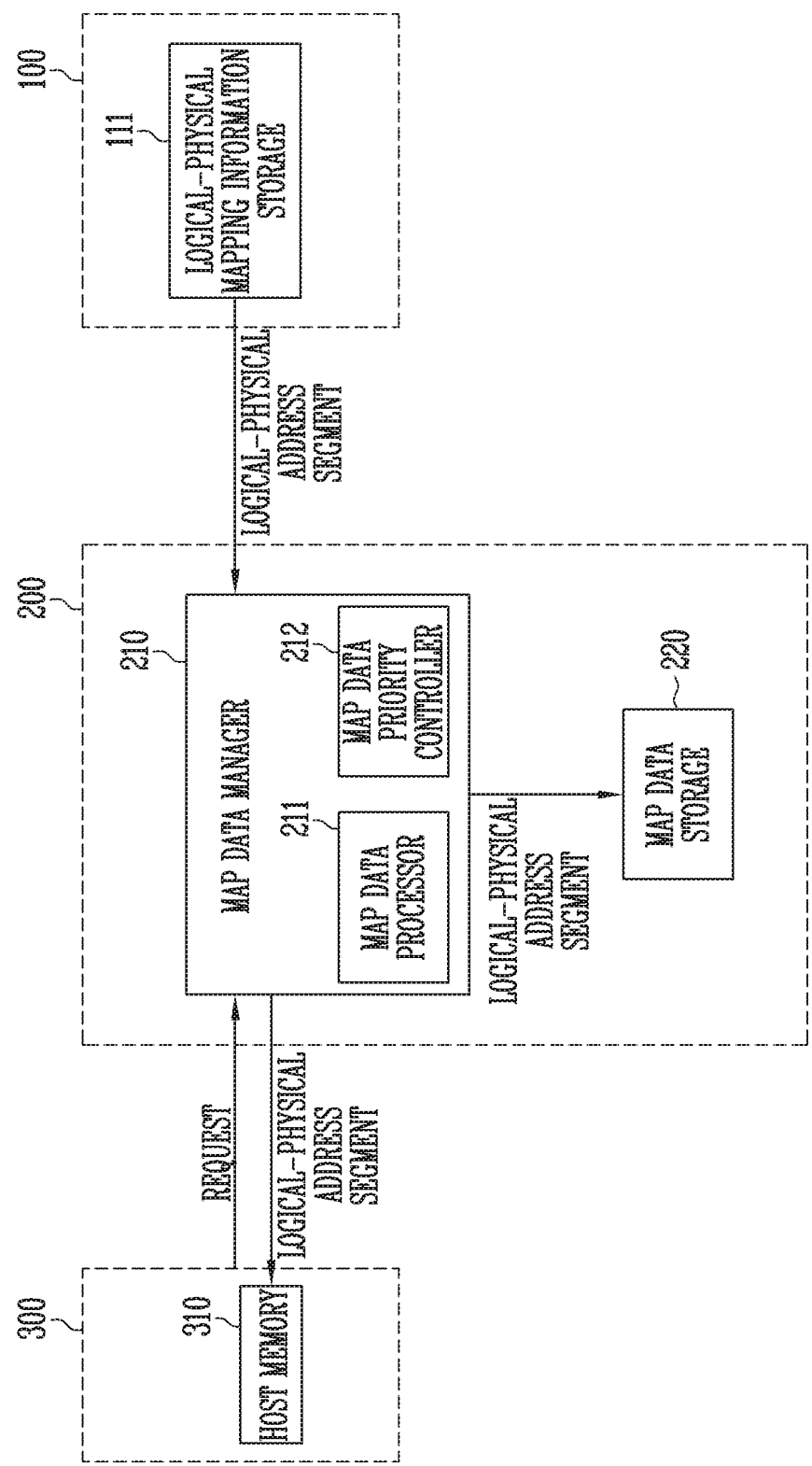
FIG. 6 is a diagram illustrating configuration and operation of a memory controller in accordance with an embodiment.

FIG. 6 is a diagram illustrating a configuration and operation of a memory controller, e.g., the memory controller 200, in accordance with an embodiment of the present disclosure.

Referring to FIG. 6, the memory device 100 may include a logical to physical mapping information storage 111.

The logical to physical mapping information storage 111 may store logical to physical mapping information. The logical to physical mapping information may indicate a mapping relationship between a logical address of data provided from the host 300 and a physical address of the memory device 100 in which the data is stored.

In an embodiment, the memory controller 200 may include a map data manager 210 and a map data storage 220. The map data manager 210 may include a map data processor 211 and a map data priority controller 212.

In an embodiment, the map data processor 211 may request a plurality of logical to physical address segments from the memory device 100. The map data processor 211 may store, in the map data storage 220, a plurality of logical to physical address segments obtained from the memory device 100.

The map data processor 211 may provide at least one of the plurality of logical to physical address segments stored in the map data storage 220 to the host 300, in response to a map data request provided from the host 300.

If the logical address of data to be read in response a read request received from the host 300 is not included in the plurality of logical to physical address segments, the map data processor 211 may receive and store a new logical to physical address segment from the memory device 100. The new logical to physical address segment may be a logical to physical address segment including a logical address of data to be read among the logical to physical address segments included in the logical to physical mapping information.

The map data processor 211 may remove, from the map data storage 220, at least one logical to physical address segment selected by the map data priority controller 212. The map data priority controller 212 may select at least one logical to physical address segment to be removed among the plurality of logical to physical address segments stored in the map data storage 220.

In an embodiment, the map data priority controller 212 may select at least one logical to physical address segment to be provided to the host 300.

In an embodiment, the map data priority controller 212 may select at least one logical to physical address segment to be provided to the host 300, based on a number of times each of the plurality of logical to physical address segments is accessed (count of access) in response to a read request provided from the host 300.

In detail, the access to the at least one L2P address segment is counted during a period between a first write operation and second write operation. Here, the first write operation and the second write operation may be successive write operations. A count of the access to the at least one L2P address segment is greater than a preset count.

In other words, after a data write operation has been performed on physical addresses, a count of performing a data read operation on the physical addresses until a subsequent data write operation is performed may be a predetermined count or more.

In an embodiment, the map data priority controller 212 may select at least one logical to physical address segment to be provided to the host 300, based on the size of data to be accessed using each of the plurality of logical to physical address segments in response to a read request provided from the host 300.

In detail, the entire size of data read by read operations of reading data stored in physical addresses included in the selected at least one logical to physical address segment may be greater than a predetermined size. It is determined that the at least one logical to physical address segment is hot data, when the entire size of data is greater the predetermined size. The data may be accessed during a period between first and second write operations of storing data in physical addresses. Specifically, the read operations of reading the data stored in the physical addresses may be performed during the period. Here, the first write operation and the second write operation may be successive write operations.

In other words, after a data write operation has been performed on physical addresses, the entire size of data read by the data read operations performed on the physical addresses until a subsequent data write operation is performed may be a fixed size.

For example, the first and second write operations of storing data in physical addresses included in at least one logical to physical address segment may be performed. After the first write operation has been performed, first to third read operations of reading the data stored in the physical addresses may be performed before the second write operation that is sequential to the first write operation is performed. The size of data read during the first read operation may be 4 kb. The size of data read during the second read operation may be 8 kb. The size of data read during the third read operation may be 8 kb. Therefore, the entire size of the data read during the read operations performed during the period between the first write operation and the second write operation may be 20 kb that is the sum of the sizes of the data read during the respective read operations.

The map data priority controller 212 may determine priorities between the plurality of logical to physical addresses segments, based on a frequency of access to each of the plurality of logical to physical address segments in response to a request provided from the host 300.

In detail, the map data priority controller 212 may set priorities between the plurality of logical to physical addresses segments, based on a least recently used (LRU) frequency of each of the plurality of logical to physical address segments to be accessed in response to a request provided from the host 300. The LRU frequency may be a relative index indicating a frequency of access to each logical to physical address segment in response to a request provided from the host 300.

In an embodiment, the map data priority controller 212 may set the priority of a logical to physical address segment such that the lower the LRU frequency value of the logical to physical address segment, the higher the priority of the logical to physical address segment. The map data priority controller 212 may set the priority of a logical to physical address segment such that the higher the LRU frequency value of the logical to physical address segment, the lower the priority of the logical to physical address segment.

The map data priority controller 212 may set the priority of at least one logical to physical address segment stored in the map data storage 220 to a specific priority. The at least one logical to physical address segment may be a logical to physical address segment provided from the map data processor 211 to the host 300. The specific priority may be determined, taking into account the time it takes for the at least one logical to physical address segment to be removed from the map data storage 220.

The map data priority controller 212 may set the priority of a new logical to physical address segment to a specific priority. The specific priority may be the highest priority. The new logical to physical address segment may be provided from the memory device 100 in response to a request of the map data processor 211 when the logical address of data to be read in response to a read request received from the host 300 is not included in the plurality of logical to physical address segments. In an embodiment, the specific priority may be the most significant priority.

When a read request is received from the host 300, the map data priority controller 212 may update the priorities of the plurality of logical to physical address segments.

In an embodiment, in response to the read request received from the host 300, any one of the plurality of logical to physical address segments may be accessed. If a logical to physical address segment is accessed, the respective LRU frequencies of the plurality of logical to physical address segments may be changed. The LRU frequency of each logical to physical address segment may be determined depending on a frequency of access to each logical to physical address segment. Therefore, the map data priority controller 212 may update the priorities of the plurality of logical to physical address segments, based on the respective changed LRU frequencies of the plurality of logical to physical address segments.

In an embodiment, the map data priority controller 212 may update the priorities of the plurality of logical to physical address segments including a new logical to physical address segment. The new logical to physical address segment may be provided from the memory device 100 in response to a request of the map data processor 211 when the logical address of data to be read in response to a read request received from the host 300 is not included in the plurality of logical to physical address segments.

The map data priority controller 212 may select at least one logical to physical address segment to be removed among the plurality of logical to physical address segments stored in the map data storage 220, based on the priorities of the plurality of logical to physical address segments.

In an embodiment, the map data priority controller 212 may select at least one logical to physical address segment in an order from the lowest priority among the plurality of logical to physical address segments as a logical to physical address segment to be removed.

In an embodiment, the map data priority controller 212 may select at least one logical to physical address segment having a priority lower than a threshold priority among the plurality of logical to physical address segments as a logical to physical address segment to be removed.

In an embodiment, the map data priority controller 212 may select a logical to physical address segment to be removed among the plurality of logical to physical address segments, based on whether the logical to physical address segment is a logical to physical address segment provided in the host 300.

For example, the map data priority controller 212 may select at least one logical to physical address segment that has a priority lower than the threshold priority among the plurality of logical to physical address segments and is provided to the host 300. The map data priority controller 212 may select a logical to physical address segment in an order from the lowest priority among the selected logical to physical address segment(s) as a logical to physical address segment to be removed.

In an embodiment, the host 300 may include a host memory 310.

The host 300 may provide a map data request to the map data processor 211 to request some of map data stored in the memory controller 200. The host 300 may store, in the host memory 310, at least one logical to physical address segment obtained from the map data processor 211 in response to the map data request.

The host 300 may provide, to the memory controller 200, a request for reading data stored in the memory device 100, based on the at least one logical to physical address segment stored in the host memory 310. In detail, the host 300 may provide, to the memory controller 200, a physical address that is mapped with a logical address of the data to be read along with the request for reading. The physical address mapped with the logical address of the data to be read may be a physical address included in at least one logical to physical address segment stored in the host memory 310.

Figure 7:
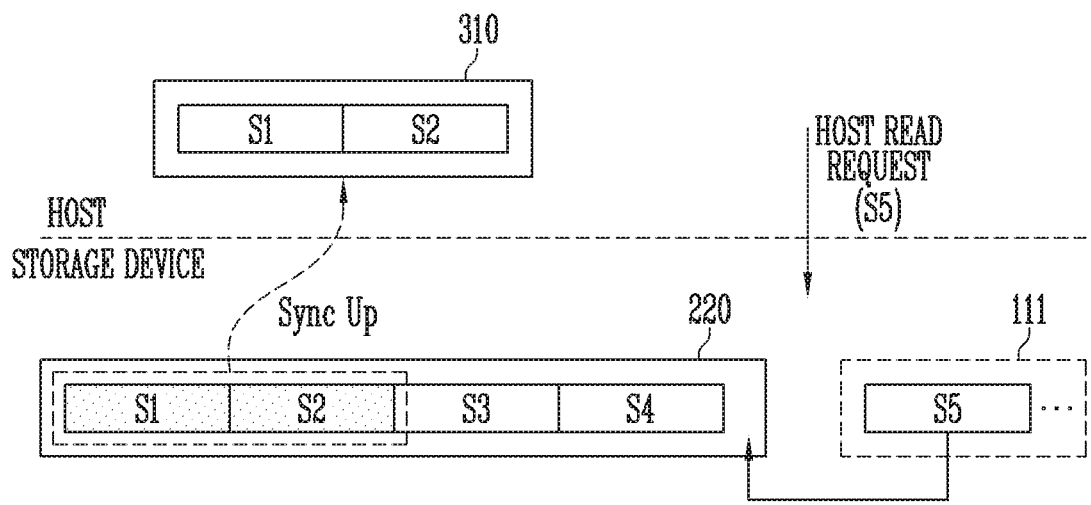
FIG. 7 is a diagram illustrating an operation of a map data manager, such as that of FIG. 6 in accordance with an embodiment.

FIG. 7 is a diagram illustrating operation of the map data manager of FIG. 6 in accordance with an embodiment.

Referring to FIG. 7, the logical to physical mapping information storage 111 may include a plurality of logical to physical address segments including a fifth logical to physical address segment S5.

The map data storage 220 may include first to fourth logical to physical address segments S1 to S4. The host memory 310 may include the first and second logical to physical address segments S1 and S2. However, the number of logical to physical address segments that are stored in the logical to physical mapping information storage 111, the map data storage 220, and the host memory 310 is not limited to that arrangement.

In an embodiment, the map data manager described with FIG. 6 may perform a sync-up operation of providing a logical to physical address segment stored in the storage device to the host in response to a request of the host. In detail, the map data manager may provide a logical to physical address segment stored in the map data storage 220 to the host memory 310 in response to a request of the host. The shaded logical to physical address segments in FIG. 7 may be logical to physical address segments provided to the host.

For example, the map data manager may provide first and second logical to physical address segments S1 and S2 among first to fourth logical to physical address segments S1 to S4 stored in the map data storage 220 to the host memory 310 in response to a request of the host.

In an embodiment, the map data manager may receive a logical address of data to be read from the host along with a read request of the host. The map data manager may determine whether the received logical address of the data to be read is included in the map data storage 220.

If the logical address of the data to be read is not included in the plurality of logical to physical address segments stored in the map data storage 220, the map data manager may request a new logical to physical address segment from the memory device described with reference to FIG. 6. The new logical to physical address segment may be a logical to physical address segment including the logical address of the data to be read among the logical to physical address mapping information in the logical to physical mapping information storage 111. The map data manager may store the new logical to physical address segment obtained from the memory device in the map data storage 220.

For example, the logical address of the data to be read by the storage device in response to a read request of the host may be a logical address included in the fifth logical to physical address segment S5. The logical address of the data to be read may not be included in the first to fourth logical to physical address segments S1 to S4 stored in the map data storage 220. Therefore, the map data manager may request, from the memory device, the fifth logical to physical address segment S5 that is the new logical to physical address segment including the logical address of the data to be read. The map data manager may obtain the fifth logical to physical address segment S5 stored in the logical to physical mapping information storage 111 from the memory device. The map data manager may store the obtained fifth logical to physical address segment S5 in the map data storage 220.

Figure 8:
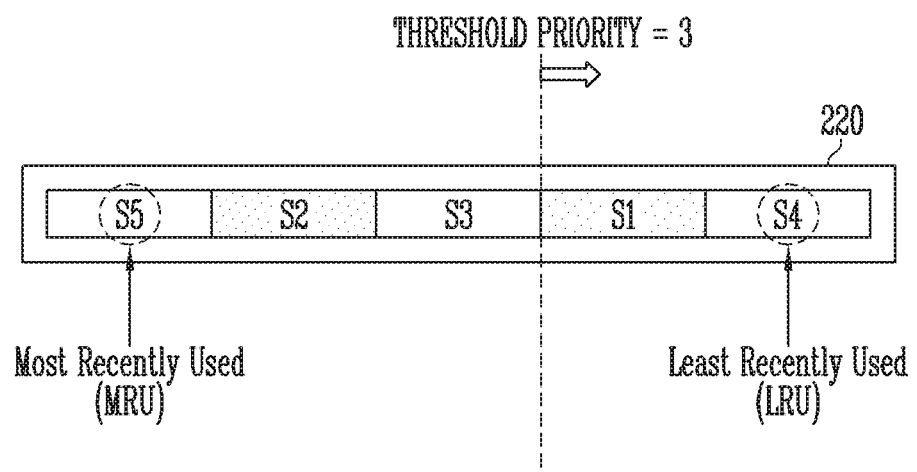
FIG. 8 is a diagram illustrating an operation of a map data manager, such as that of FIG. 6 in accordance with an embodiment.

FIG. 8 is a diagram illustrating operation of the map data manager of FIG. 6 in accordance with an embodiment.

Referring to FIG. 8, the map data storage 220 may store the first to fifth logical to physical address segments S1 to S5 described with reference to FIG. 7. The first and second logical to physical address segments S1 and S2 may be logical to physical address segments provided to the host. The fifth logical to physical address segment may be a new logical to physical address segment. The number of logical to physical address segments stored in the map data storage 220 is not limited to this embodiment.

The map data manager may determine priorities between the plurality of logical to physical addresses segments, based on a frequency of access to each of the plurality of logical to physical address segments in response to a request provided from the host.

In detail, the map data manager may set priorities between the plurality of logical to physical addresses segments, based on a least recently used (LRU) frequency of each of the plurality of logical to physical address segments to be accessed in response to a request provided from the host. The LRU frequency may be a relative index indicating a frequency of access to each logical to physical address segment in response to a request provided from the host.

For example, as the frequency of access to the logical to physical address segment in response to a request of the host increases, the LRU frequency value of the logical to physical address segment may be reduced. The map data manager may set the priority of a logical to physical address segment such that the lower the LRU frequency value of the logical to physical address segment, the higher the priority of the logical to physical address segment. The logical to physical address segments may be arranged in the map data storage 220 from highest to lowest priority, which is left to right in FIG. 8.

As the frequency of access to the logical to physical address segment in response to a request of the host decreases, the LRU frequency value of the logical to physical address segment may be increased. The map data manager may set the priority of a logical to physical address segment such that the higher the LRU frequency value of the logical to physical address segment, the lower the priority of the logical to physical address segment. The lower the priority of the logical to physical address segment, the more to the right it is positioned in the map data storage 220, as shown in FIG. 8. In other words, as the position of the logical to physical address segment is moved from the left to the right, the priority of the logical to physical address segment may be lowered.

In an embodiment, in response to a read request received from the host, any one of the plurality of logical to physical address segments may be accessed. If a logical to physical address segment is accessed, the respective LRU frequencies of the plurality of logical to physical address segments may be changed. Therefore, the map data manager may update the priorities of the plurality of logical to physical address segments, based on the respective changed LRU frequencies of the plurality of logical to physical address segments.

In an embodiment, if a new logical to physical address segment is stored in the map data storage 220, the map data manager may update the priorities of the plurality of logical to physical address segments including the new logical to physical address segment. The map data manager may set the priority of the new logical to physical address segment to a priority, which may be predetermined to be the most significant priority.

In an embodiment, the map data manager may set the priority of at least one logical to physical address segment provided to the host among the plurality of logical to physical address segments stored in the map data storage 220. The priority may be determined and set, taking into account the time it takes for the at least one logical to physical address segment to be removed from the map data storage 220. The priority may be set to prevent the at least one logical to physical address segment from being evicted from the map data storage 220 immediately, right after the at least one logical to physical address segment is provided to the host 300. The priority may set as a preset value, which is determined based on a time estimated the at least one L2P address segment is evicted from the map data storage 220.

For example, the map data manager may set the priority of the fifth logical to physical address segment S5 that is the new logical to physical address segment to a first priority that is the most significant priority. The map data manager may set the priority of the first logical to physical address segment S1 that is a logical to physical address segment provided to the host to a fourth priority, which may be predetermined. The map data manager may set the priority of the second logical to physical address segment S2 that is a logical to physical address segment provided to the host to a second priority, which may be predetermined.

The priorities the third and fourth logical to physical address segments S3 and S4 may be set based on the respective LRU frequencies. The LRU frequency may be determined based on the frequency of access to each logical to physical address segment in response to a request of the host. In FIG. 8, the priority of the third logical to physical address segment S3 may be a third priority. The priority of the fourth logical to physical address segment S4 may be a fifth priority that is the least significant priority.

The map data manager may select at least one logical to physical address segment having a priority lower than the threshold priority among the plurality of logical to physical address segments stored in the map data storage 220. The threshold priority may vary depending on map data management policy.

The map data manager may select a logical to physical address segment having a relatively low priority among the selected logical to physical address segment(s) as a logical to physical address segment to be removed. The map data manager may determine whether the corresponding logical to physical address segment is a logical to physical address segment to be removed, based on whether it is a logical to physical address segment provided to the host among the selected logical to physical address segment(s).

In FIG. 8, the threshold priority may be the third priority. The map data manager may select the first logical to physical address segment S1 and the fourth logical to physical address segment S4 each of which has a priority lower than the third priority that is the threshold priority.

The map data manager may determine whether the fourth logical to physical address segment S4 having a comparatively low priority between the selected first and fourth logical to physical address segments S1 and S4 is a logical to physical address segment that is to be first removed. Since, although the priority of the fourth logical to physical address segment S4 is lower than that of the first logical to physical address segment S1, the fourth logical to physical address segment S4 is not a logical to physical address segment that has been provided to the host, the map data manager may determine that the fourth logical to physical address segment S4 is not a logical to physical address segment to be removed.

Subsequently, the map data manager may determine whether the first logical to physical address segment S1 is a logical to physical address segment to be removed. Although the priority of the first logical to physical address segment S1 is higher than that of the fourth logical to physical address segment S4, the first logical to physical address segment S1 may be determined to be a logical to physical address segment to be removed, because it is a logical to physical address segment that has been provided to the host.

The map data manager may remove, from the map data storage 220, the first logical to physical address segment S1 that has been determined to be a logical to physical address segment to be removed.

In an embodiment, there is a relatively low penalty for removing any of the logical to physical address segments that have been provided to the host during the sync-up operation from the memory controller, compared to that of the logical to physical address segments that have not been provided to the host. The reason is because, although a logical to physical address segment that has been provided to the host is removed from the memory controller, it may be provided from the host again, but, if a logical to physical address segment that has not been provided to the host is removed from the memory controller, it has to be obtained from the memory device. Therefore, the map data manager may determine whether to remove a logical to physical address segment from the map data storage 220, based on whether the corresponding logical to physical address segment has been provided to the host.

In an embodiment, the term "most recently used (MRU) frequency" may be the opposite of the LRU frequency. As the LRU frequency value is increased, the MRU frequency value may be reduced. As the LRU frequency value is reduced, the MRU frequency value may be increased.

Figure 9:
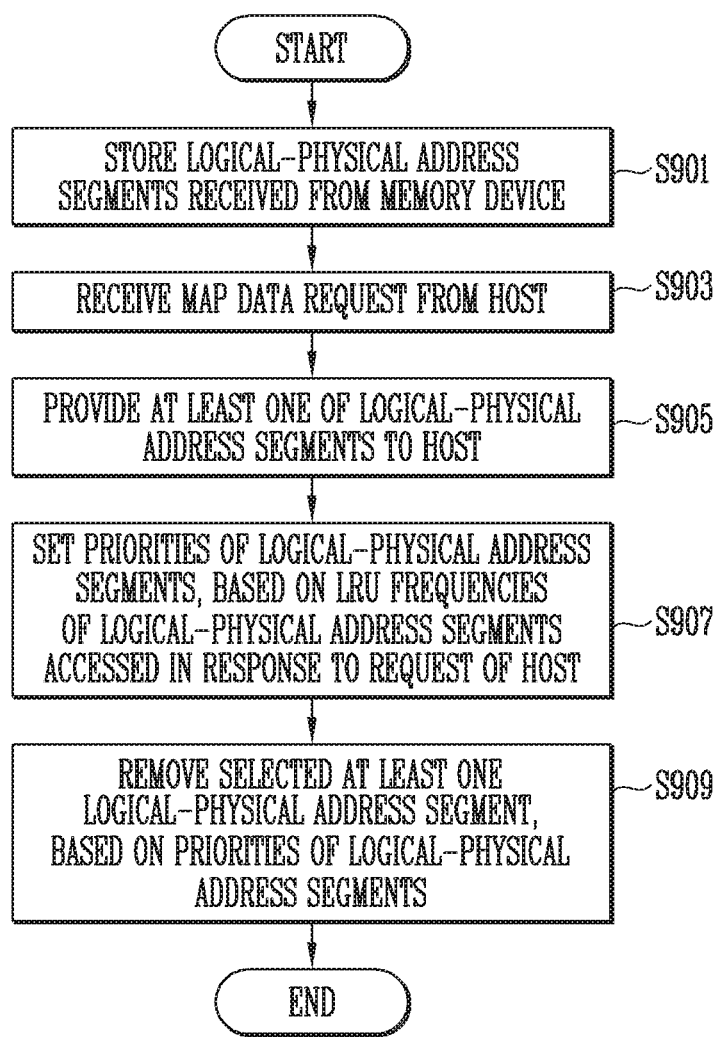
FIG. 9 is a flowchart illustrating an operation of the memory controller in accordance with an embodiment.

FIG. 9 is a flowchart illustrating an operation of the memory controller in accordance with an embodiment.

Referring to FIG. 9, at step S901, the memory controller may store a plurality of logical to physical address segments received from the memory device.

At step S903, the memory controller may receive a map data request from the host.

At step S905, the memory controller may provide at least one logical to physical address segment among the plurality of stored logical to physical address segments to the host in response to the map data request received from the host.

At step S907, the memory controller may set the priorities of the plurality of logical to physical address segments, based on the respective LRU frequencies of the plurality of logical to physical address segments accessed in response to a request of the host.

At step S909, the memory controller may remove at least one logical to physical address segment selected based on the priorities of the plurality of logical to physical address segments.

Figure 10:
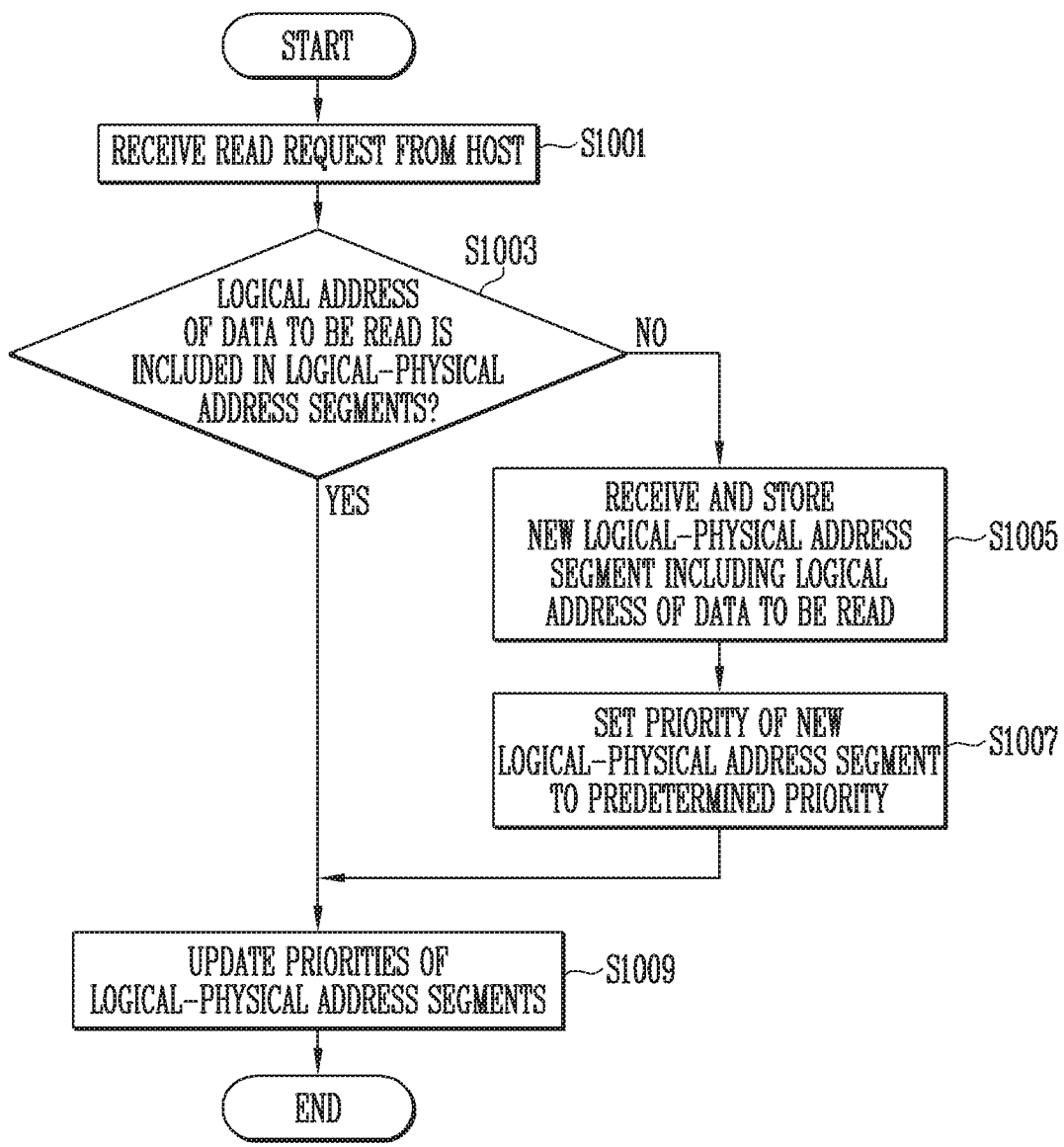
FIG. 10 is a flowchart illustrating in detail an operation of the memory controller of FIG. 9.

FIG. 10 is a flowchart illustrating an operation of the memory controller of FIG. 9.

Referring to FIG. 10, at step 1001, the memory controller may receive a read request from the host.

At step S1003, the memory controller may determine whether a logical address of data to be read in response to the read request is included in the plurality of logical to physical address segments. As a result of the determination, if the logical address of the data to be read is included in the plurality of logical to physical address segments, the process proceeds to step S1009. If not, the process proceeds to step S1005.

At step S1005, the memory controller may receive a new logical to physical address segment including the logical address of the data to be read from the memory device and store the new logical to physical address segment.

At step S1007, the memory controller may set the priority of the new logical to physical address segment to a priority, which may be predetermined as the most significant priority.

At step S1009, the memory controller may update the priorities of the plurality of logical to physical address segments. In an embodiment, the memory controller may access any one logical to physical address segment including the logical address of the data to be read among the plurality of logical to physical address segments. If a logical to physical address segment is accessed, the frequencies of access to the plurality of logical to physical address segments may be changed. The memory controller may update the priorities of the plurality of logical to physical address segments, based on the respective changed access frequencies of the plurality of logical to physical address segments.

In an embodiment, the memory controller may update the priorities of the plurality of logical to physical address segments including the priority of the new logical to physical address segment.

FIG. 11 is a flowchart illustrating in detail an operation of the memory controller of FIG. 9.

Referring to FIG. 11, at step S1101, the memory controller may select one or more logical to physical address segments each having a priority lower than a threshold priority among the plurality of logical to physical address segments. The selected logical to physical address segment(s) may be removed from the memory controller.

At step S1103, the memory controller may set the priority to the least significant priority. The least significant priority may be the lowest priority among the priorities between the plurality of logical to physical address segments stored in the memory controller.

At step S1105, the memory controller may determine whether the logical to physical address segment having the least significant priority among the selected logical to physical address segment(s) is a logical to physical address segment that has been provided to the host. As a result of the determination, if the logical to physical address segment having such priority is a logical to physical address segment that has been provided to the host, the process proceeds to step S1109. If not, the process proceeds to step S1107.

At step S1107, the memory controller may increase the priority by 1. The maximum value of the priority that may be increased by the memory controller may be lower than the threshold priority.

At step 1109, the memory controller may remove the logical to physical address segment having the priority among the plurality of logical to physical address segments.

FIG. 11A is a flowchart illustrating an operation of the memory controller 200 in accordance with an embodiment of the present invention.

A computing system may include the host 300, the memory controller 200 and the memory device 100. The memory controller 200 may include a map cache.

At step S1201, the map cache may cache one or more pieces of map data from the memory device 100 configured to store plural pieces of map data. In an embodiment, a piece of map data may correspond to the above described logical to physical address segment but is not limited thereto.

In an embodiment, the memory controller 200 may control the map cache to cache one or more pieces of map data upon a cache-miss of the map cache (refer to step S901 of FIG. 9, steps S1003 and S1005 of FIG. 10 and the fifth logical to physical address segment S5 of FIG. 7). The cache-miss may occur within the map cache when the map cache is not currently caching therein map data corresponding to an access request provided from the host 300.

The memory controller 200 may not control the map cache to cache one or more pieces of map data upon a cache-hit of the map cache (refer to steps S1003 and S1009 of FIG. 10). The cache-hit may occur within the map cache when the map cache is currently caching therein map data corresponding to an access request provided from the host 300. The memory controller 200 may control the memory device 100 to perform an operation according to the cache-hit map data in response to the access request. Upon the cache-hit, the LRU values (e.g., the LRU frequencies) of the cached pieces may change within the map cache due to the cache-hit map data within the map cache.

As described above, the physical address provided together with an access request by the host 300 to the memory controller 200 may have been previously provided by the memory controller 200 to the host 300 through the sync-up operation, as described with reference to steps S903 and S905 of FIG. 9 and step S1203 of FIG. 11A. A piece of map data corresponding to that physical address may also be cached in the map cache, as described with reference to step S901 of FIG. 9, steps S1003 and S1005 of FIG. 10, the first and second logical to physical address segments S1 and S2 of FIG. 7 and step S1201 of FIG. 11A.

For example, when the access request is successfully serviced according to the physical address provided from the host 300, the piece of map data corresponding to the successful physical address and cached in the map cache may be regarded as cache-hit.

In an embodiment, the map cache may correspond to the map data storage 220 but is not limited thereto.

At step S1203, the memory controller 200 may provide the host 300 with one or more among the pieces cached in the map cache to synchronize the provided one or more among the cached pieces with the host 300. In an embodiment, step S1203 may correspond to steps S903 and S905 of FIG. 9 but is not limited thereto. As described above, the host 300 may provide the memory controller 200 with an access request together with an item or piece of the synchronized map data. When the access request is successfully serviced according to the provided synchronized map data, the successful map data also cached in the map cache due to the synchronization may be regarded as cache-hit. Upon the cache-hit, the LRU values (e.g., the LRU frequencies) of the cached pieces may change within the map cache due to the cache-hit map data within the map cache.

At step S1205, the memory controller 200 may evict from the map cache least recently cache-hit piece(s) synchronized at step S1203. A cache-hit piece may be a piece of map data corresponding to the cache-hit map data.

The least recently cache-hit piece(s) may be selected on the basis of the LRU scheme. In an embodiment, the least recently cache-hit piece(s) may be selected and evicted as described with reference to steps S907 and S909 of FIG. 9, S1007 and S1009 of FIG. 10 and S1101 to S1109 of FIG. 11 but the selection and the eviction is not limited thereto.

According to step S1205, a cached piece, which is not synchronized between the map cache and the host 300, may not be evicted from the map cache even when the cached piece has the greatest LRU value (e.g., the LRU frequency) within the map cache (refer to the first and fourth segments S1 and S4 of FIG. 8).

Figure 12:
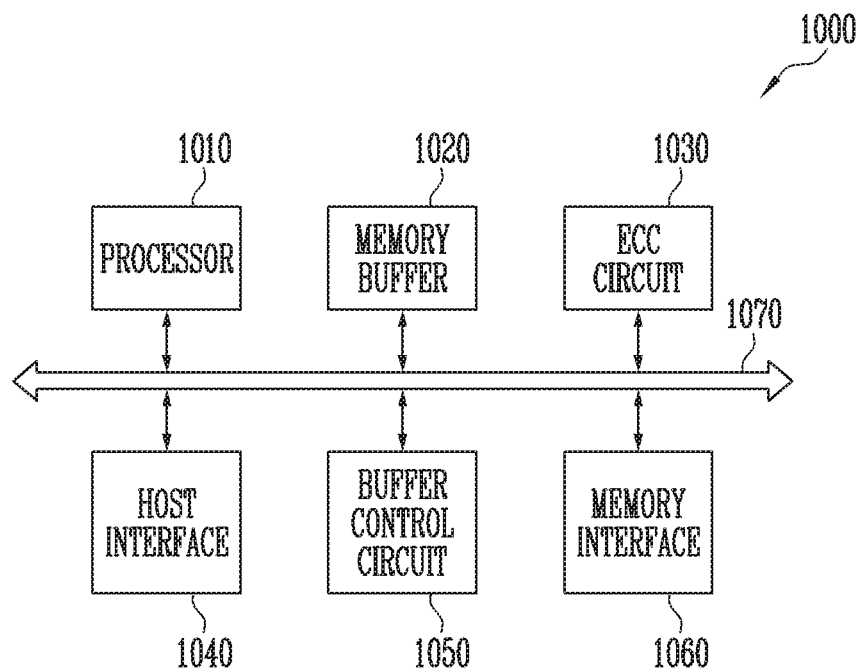
FIG. 12 is a diagram illustrating an example of the memory controller of FIG. 1.

FIG. 12 is a diagram illustrating an example of the memory controller of FIG. 1.

Referring to FIG. 12, a memory controller 1000 is coupled to a host and a memory device. In response to a request from the host, the memory controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host Interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the host through the host interface 1040, and communicate with the memory device through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device as data to be stored, and may be programmed to the memory cell array.

During a read operation, the processor 1010 may derandomize data received from the memory device 100. For example, the processor 1010 may use a derandomizing seed to derandomize data received from the memory device. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device through the memory interface 1060. The ECC circuit 1030 may perform an ECC decoding operation on data received from the memory device through the memory interface 1060. For example, the ECC circuit 1030 may be included in the memory interface 1060 as a component of the memory interface 1060.

The host interface 1040 may communicate with the host under control of the processor 1010. The host interface 1040 may perform communication using at least one of various communication methods such as a universal serial bus (USB), a serial AT attachment (SATA), a serial attached SCSI (SAS), a high speed intership (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device through the channel.

In an embodiment, the memory controller 1000 may include neither the memory buffer 1020 nor the buffer control circuit 1050. These components may be separate or their functionality distributed among other components of the memory controller 1000.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other so as not interfere with, or affect, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the processor 1010 may perform the operation of the map data manager described with reference to FIG. 1. The memory buffer 1020 may include the map data storage described with reference to FIG. 1.

Figure 13:
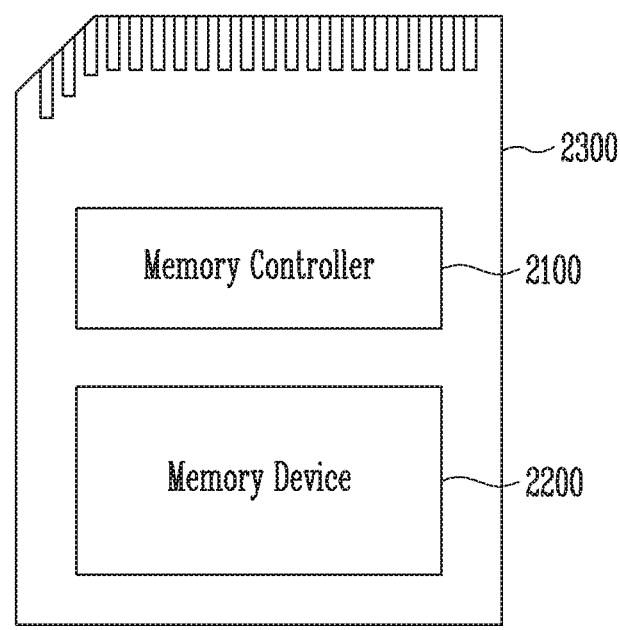
FIG. 13 is a block diagram illustrating a memory card system to which the storage device is applied, in accordance with an embodiment of the present disclosure.

FIG. 13 is a block diagram illustrating a memory card system 2000 to which the storage device is applied, in accordance with an embodiment of the present disclosure.

Referring FIG. 13, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processor, a host interface, and a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card, such as a personal computer memory card international association (PCM-CIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 14:
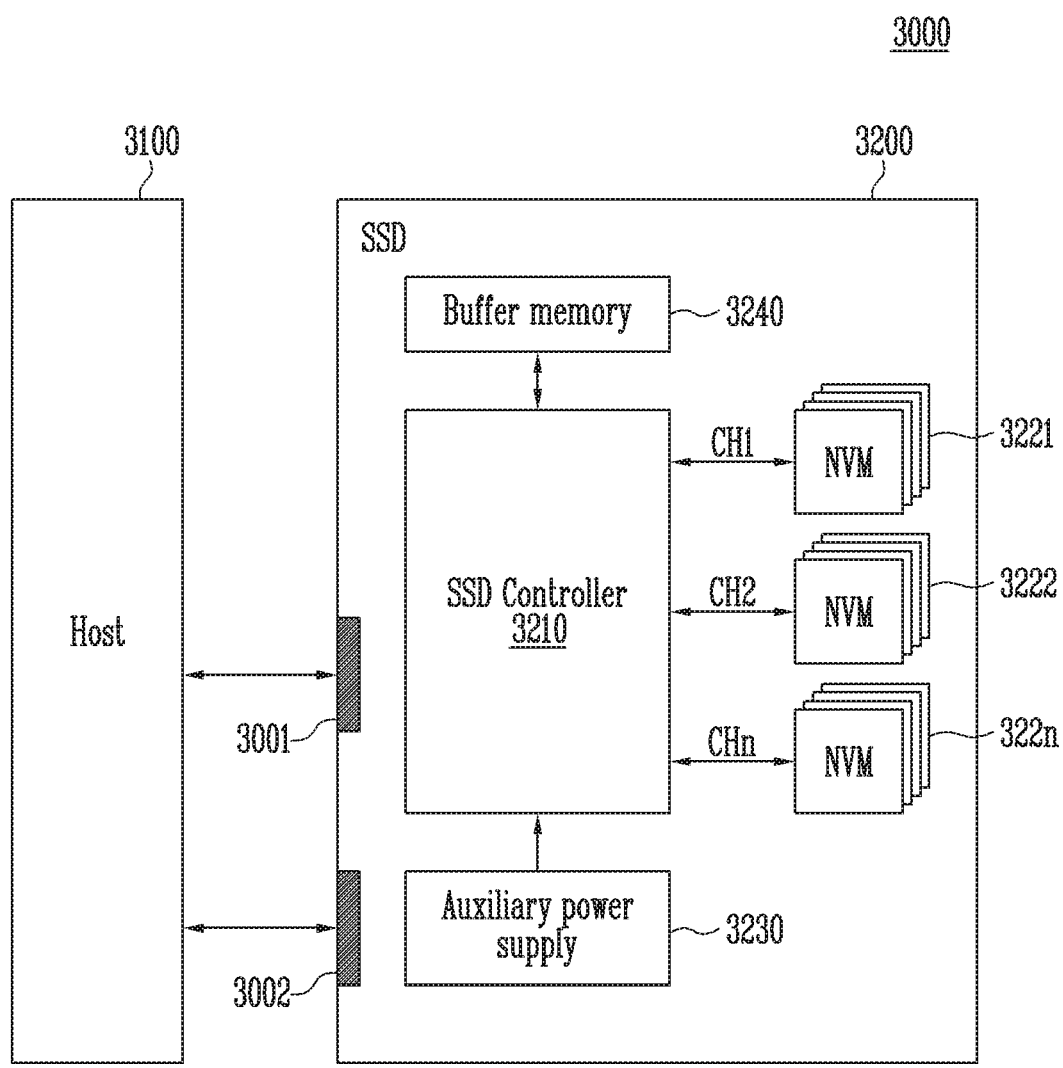
FIG. 14 is a block diagram illustrating a solid state drive (SSD) system to which the storage device is applied, in accordance with an embodiment of the present disclosure.

FIG. 14 is a block diagram illustrating a solid state drive (SSD) system 3000 to which the storage device is applied, in accordance with an embodiment of the present disclosure.

Referring to FIG. 14, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be defined by at least one of various interfaces, such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply power to the SSD 3200 when the supply of power from the host 3100 is not smoothly supplied. In an embodiment, the auxiliary power supply 3230 may be within or external to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include any of various volatile memories, such as a DRAM, an SDRAM, a DDR SDRAM, an LPDDR SDRAM, and a GRAM or nonvolatile memories such as an FRAM, a ReRAM, an STT-MRAM, and a PRAM.

Figure 15:
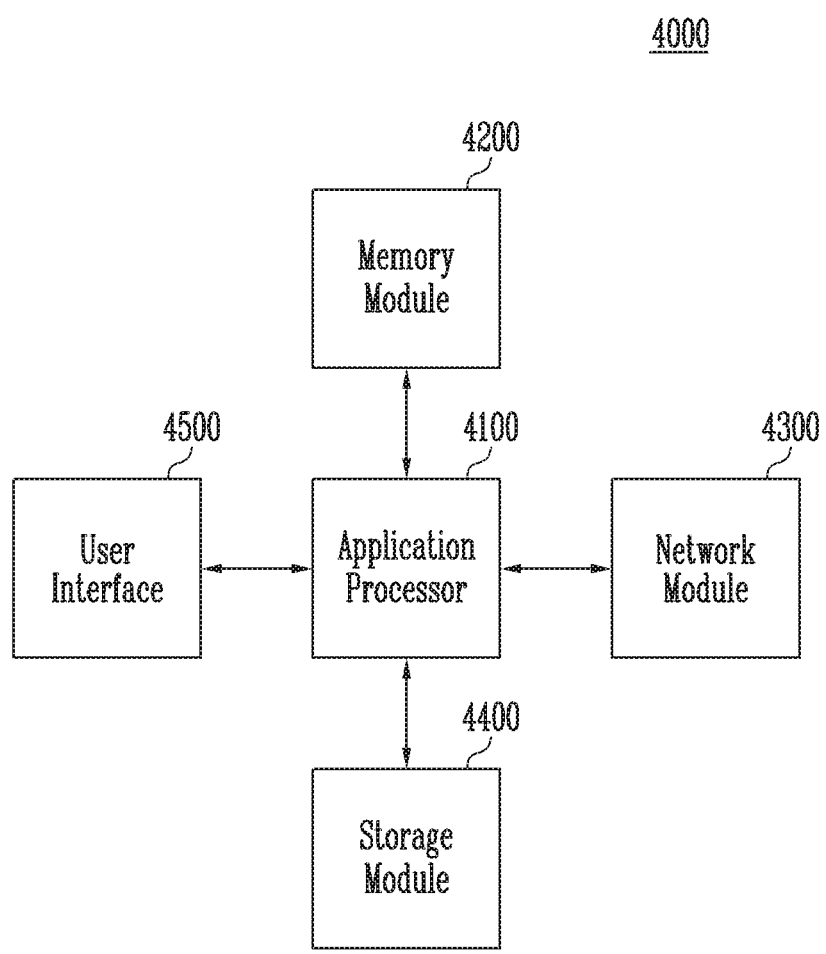
FIG. 15 is a block diagram illustrating a user system to which the storage device is applied, in accordance with an embodiment of the present disclosure.

FIG. 15 is a block diagram illustrating a user system 4000 to which the storage device is applied, in accordance with an embodiment of the present disclosure.

Referring to FIG. 15, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile RAM such as a PRAM, a ReRAM, an MRAM, and/or an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIG. 1. The storage module 4400 may be operated in the same manner as that of the storage device 50 described above with reference to FIG. 1.

The user interface 4500 may include interfaces for inputting data or instructions to the application processor 4100 or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

What is claimed is:

1. A memory controller configured to control a memory device for storing logical to physical (L2P) mapping information, the memory controller comprising:
    a map data storage configured to store a plurality of L2P address segments included in the L2P mapping information; and
    a map data manager configured to:
    provide at least one L2P address segment of the plurality of L2P address segments to the host in response to a map data request of the host; and
    remove a L2P address segment from the map data storage, wherein the L2P address segment is selected, among the plurality of L2P address segments, based on a least recently used (LRU) frequency and whether the L2P address segment is provided to the host.

2. The memory controller according to claim 1, wherein the map data manager comprises:

a map data priority controller configured to set priorities between the plurality of L2P address segments based on the respective LRU frequencies; and a map data processor configured to:
provide the at least one L2P address segment to the host in response to the map data request of the host; and
remove the selected L2P address segment from the map data storage based on the priorities.

3. The memory controller according to claim 2, wherein the map data priority controller updates the priorities when any one L2P address segment of the plurality of L2P address segments is accessed in response to a read request of the host.

4. The memory controller according to claim 2, wherein the map data priority controller sets a priority of the at least one L2P address segment provided to the host as a preset value,
wherein the preset value is determined based on a time estimated the at least one L2P address segment is evicted from the map data storage.

5. The memory controller according to claim 2, wherein, when a logical address of data to be read in response to a read request of the host is not included in the plurality of L2P address segments, the map data processor receives a new L2P address segment including the logical address of the data to be read among the L2P mapping information from the memory device and stores the new L2P address segment in the map data storage.

6. The memory controller according to claim 5, wherein the map data priority controller sets a priority of the new L2P address segment as a highest value, and updates the priorities between the plurality of L2P address segments including the new L2P address segment.

7. The memory controller according to claim 2, wherein the selected L2P address segment is a L2P address segment having a lower priority than a threshold priority, among the at least one L2P address segment provided to the host.

8. The memory controller according to claim 2, wherein the selected L2P address segment is provided to the host before the selected L2P address segment is removed from the map data storage.

9. The memory controller according to claim 2, wherein the map data priority controller selects the at least one L2P address segment to be provided to the host, based on a count of access to each of the plurality of L2P address segments or a size of data to be accessed using each of the plurality of L2P address segments.

10. The memory controller according to claim 9,
wherein, the access to the at least one L2P address segment is counted during a period between a first write operation and second write operation, and
wherein a count of the access to the at least one L2P address segment is greater than a preset count.

11. A method of operating a memory controller including a map cache configured to store map data, the method comprising:
storing a plurality of logical to physical (L2P) address segments received from the memory device in the map cache;
providing at least one L2P address segment among the plurality of L2P address segments to a host in response to a map data request of the host;
selecting a L2P address segment from among the plurality of L2P address segments, based on a least recently used (LRU) frequency and whether the L2P address segment is provided to the host; and removing the selected L2P address segment from the map cache.

12. The method according to claim 11,
wherein the selecting the L2P address segment comprises:
setting priorities between the plurality of L2P address segments based on the respective LRU frequencies; and
updating the priorities when any one L2P address segment among the plurality of L2P address segments is accessed.

13. The method according to claim 12, wherein the selected L2P address segment is a L2P address segment having a lower priority than a threshold priority, among the at least one L2P address segment provided to the host.

14. The method according to claim 11, further comprising selecting the at least one L2P address segment to be provided to the host, based on a count of access to each of the plurality of L2P address segments or a size of data to be accessed using each of the plurality of L2P address segments.

15. A computing system comprising:
a storage device; and
a host configured to access the storage device,
wherein the storage device comprises:
a memory device configured to store logical to physical (L2P) mapping information including a plurality of L2P address segments; and
a memory controller including a map cache for storing map data, and configured to:
store the plurality of L2P address segments received from the memory device;
provide at least one L2P address segment of the plurality of L2P address segments to the host in response to a map data request of the host; and
remove, a L2P address segment from the map cache, and
wherein the L2P address segment is selected, among the plurality of L2P address segments, based on a least recently used (LRU) frequency and whether the L2P address segment is provided to the host.

16. The computing system according to claim 15, wherein the memory controller sets priorities between the plurality of L2P address segments based on the respective LRU frequencies, and removes the selected L2P address segment from the map cache based on the priorities.

17. The computing system according to claim 16, wherein the selected L2P address segment is a L2P address segment having a lower priority than a threshold priority, among the at least one L2P address segment provided to the host.

18. The computing system according to claim 16, wherein the memory controller sets a priority of the at least one L2P address segment provided to the host as a preset value, and
wherein the preset value is determined based on a time estimated the at least one L2P address segment is evicted from the map data storage.

19. The computing system according to claim 15, wherein the memory controller selects the at least one L2P address segment to be provided to the host among the plurality of L2P address segments, based on a count of access to each of the plurality of L2P address segments or a size of data to be accessed using each of the plurality of L2P address segments.

20. The computing system according to claim 15, wherein the host is configured to store the at least one L2P address segment obtained in response to the map data request, and provides, to the storage device, a read request based on the at least one L2P address segment.

* * * * *